3,238,125
METHOD FOR EFFECTING CONTINUOUS FILTRATION
Kazuhiko Mihara and Takashi Yamashiki, Yokohama, Japan, assignors to Asahi Kasei Kogyo Kabushiki Kaisha, Osaka, Japan, a corporation of Japan
Filed Dec. 13, 1962, Ser. No. 245,361
Claims priority, application Japan, Apr. 5, 1962, 37/12,859
1 Claim. (Cl. 210—20)

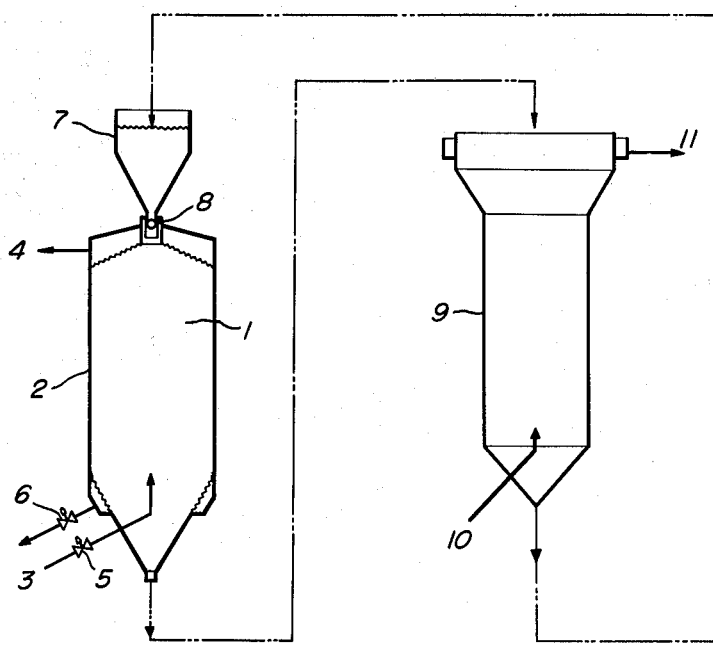

This invention relates to a continuous filtration apparatus, wherein filtration is effected at a high flow rate, by causing the liquid which undergoes treatment to contact a suitably selected and continuously transferred filtrating material while the filtrating material is continuously washed.

In the attached drawing, the sole figure diagrammatically shows an apparatus embodying the present invention. Our copending U.S. patent application No. 115,245 now U.S. Pat. 3,152,072, relates to an ion exchange apparatus of the movable bed type, which comprises an ion exchangeable liquid-passing vessel, a regenerating vessel and a water-washing vessel separately disposed but functionally combined, and in which ion exchange resin is continuously discharged from each of these vessels by means of individual internal liquid pressure caused therein while the resin is fed intermittently by a means of magnet valves operated by cycle timer.

The apparatus of the present invention operates in the general manner of the aforesaid apparatus of the patent, but effects a novel filtration procedure. Referring to the drawing, a liquid 3 to be treated is introduced by means of a pump through the bottom portion of a liquid-passing vessel 2 packed with a suitable filtrating material 1 (e.g. anthracite), whereby the filtrating material above the liquid inlet 3 is upwardly displaced in the form of an upper means constituted of a series of layers as will be discussed more fully hereinafter. The liquid which has been filtered by the filtrating layers is removed as a treated liquid 4 at the top portion of the said vessel.

After passage of the liquid for a determined time, a liquid-passing valve 5 is shut and a liquid-exhausting valve 6 is opened to allow flow of the liquid from the vessel via valve 6. Thus the internal pressure of the vessel is decreased, whereby the filtrating material retained in the form of layers is transferred in a downwards direction. The filtrating material which accompanies undissolved material is led to deposition, while fresh filtrating material is filled through a check valve 8 from a top hopper 7 and forms a new layer on the layered mass of filtrating material in the vessel. Thus there is formed stratified layers of filtrating material, successively higher layers being more pure. After charging the fresh filtering material in a predetermined amount, the liquid-passing valve is opened again, and the check valve closed to resume filtration. On the other hand, the undissolved mass as well as the filtrating material in the bottom of the vessel below the liquid inlet 3 is in the form of a lower mass of layers and is continuously passed to the water-washing vessel 9 by the action of pumping pressure while the liquid is passed through the apparatus.

In the above operation, the liquid-passing period is far greater than the liquid-draining period for instance, for each one hour liquid-passing period there is a 15 second liquid-draining period. Consequently, the operation may be regarded as a substantially continuous operation.

Into the washing vessel 9, the filtrating material withdrawn from the liquid-passing vessel is continuously introduced at the top, while washing water 10 is fed through the bottom. Undissolved mass accompanied by the filtrating material is withdrawn through the top opening 11, and the washed filtrating material is discharged from the bottom of vessel 9 and then fed to the hopper 7 of the liquid-passing vessel with pressure.

In accordance with the present invention, operation and control of the apparatus is very simple, because it is only necessary to operate the liquid-passing valve and liquid-draining valve of the liquid-passing vessel at predetermined time intervals, without necessitating incessant and laborious shutting-and-opening operation of many valves. Furthermore, it is possible to obtain a constant supply of good quality filtrate, and therefore the necessity of large capacity tanks is eliminated.

*Example*

A copper sulfate solution containing a small amount of basic copper sulfate precipitate is filtered by passing the solution through a vessel packed with anthracite.

Ascending flow rate: 30 m./hr.
Liquid-passing time: 30 minutes.
Amount of filtrating material circulated: 500 l./hr.
Liquid-draining time: 30 seconds.

The withdrawn filtrating material is extracted and washed with a dilute sulfuric acid before reuse. The product, a completely transparent solution, was continuously obtained.

What we claim is:

A method for effecting continuous filtration by continuously transferring filtrating material in a liquid passing vessel in which filtration is effected, said method comprising upwardly passing liquid to be filtered through said liquid passing vessel which contains the filtrating material, the liquid being introduced at an intermediate level in the vessel to divide the filtrating material into a lower mass below the feed level constituted of exhausted filtrating material resulting from a preceding cycle and an upper mass above said feed level, passing the liquid upwardly through the upper mass to effect therein filtration by counter current contact with the filtrating material supplied from the top of the vessel, continuously discharging exhausted filtrating material from said lower mass by the internal pressure exerted by the passing of the liquid, periodically terminating the feed of liquid into the vessel while simultaneously discharging the liquid retained in said vessel at a level proximate said intermediate level said feed being terminated after a predetermined period of time and causing a reduction of internal pressure within the vessel and concurrent dropping of said upper mass while fresh filtrating material is supplied in the form of a layer on the top of said upper mass simultaneously said upper mass being thereby constituted by stratified layers of increasing purity towards the top of the vessel, the supply of fresh filtrating material into the vessel being terminated upon the subsequent introduction of liquid to be treated into the vessel for upward passage therethrough, introducing the exhausted filtrating material from said liquid passing vessel into the top of a washing vessel which is functionally connected with said liquid passing vessel in series, passing a washing reagent upwardly into said washing vessel thereby to effect counter current washing of the filtrating material with the washing reagent, exhausting the spent washing reagent from the top of the washing vessel, and discharging from the bottom of the washing vessel the washed material and recycling the same to the top of the liquid passing vessel for reuse.

References Cited by the Examiner

UNITED STATES PATENTS

| | | | |
|---|---|---|---|
| 2,973,319 | 2/1961 | Porter | 210—33 |
| 3,152,072 | 10/1964 | Yomiyama et al. | 210—33 |

OTHER REFERENCES

Porter I—Chemical Week, vol. 78, April–June 1956, pp. 74–76 relied upon.

MORRIS O. WOLK, *Primary Examiner.*